(12) United States Patent
Pang et al.

(10) Patent No.: US 11,662,220 B2
(45) Date of Patent: *May 30, 2023

(54) METHOD AND SERVER FOR DELIVERING INFORMATION TO USER TERMINAL

(71) Applicant: Advanced New Technologies Co., Ltd., Grand Cayman (KY)

(72) Inventors: Lei Pang, Beijing (CN); Depin Zhang, Beijing (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 192 days.

This patent is subject to a terminal disclaimer.

(21) Appl. No.: 17/328,810

(22) Filed: May 24, 2021

(65) Prior Publication Data

US 2021/0278238 A1 Sep. 9, 2021

Related U.S. Application Data

(63) Continuation of application No. 15/960,485, filed on Apr. 23, 2018, now Pat. No. 11,015,953, which is a
(Continued)

(51) Int. Cl.
*G01C 21/36* (2006.01)
*H04W 4/02* (2018.01)
(Continued)

(52) U.S. Cl.
CPC ..... *G01C 21/3697* (2013.01); *G01C 21/3484* (2013.01); *G06F 16/9537* (2019.01);
(Continued)

(58) Field of Classification Search
CPC ........... G01C 21/3697; G01C 21/3484; G01C 21/3446; G06F 16/9537; G06Q 30/0251;
(Continued)

(56) References Cited

U.S. PATENT DOCUMENTS

| | | | |
|---|---|---|---|
| 5,948,040 | A | 9/1999 | DeLorme |
| 6,571,279 | B1 | 5/2003 | Herz et al. |

(Continued)

FOREIGN PATENT DOCUMENTS

| | | | |
|---|---|---|---|
| CN | 103366292 A | | 10/2013 |
| CN | 103810261 A | | 5/2014 |

(Continued)

OTHER PUBLICATIONS

A First Office Action dated Jan. 30, 2018, issued by The State Intellectual Property Office of the People's Republic of China in counterpart Chinese Patent Application No. 201410475482.6.
(Continued)

*Primary Examiner* — Jason Holloway
(74) *Attorney, Agent, or Firm* — Finnegan, Henderson, Farabow, Gararett & Dunner, LLP

(57) ABSTRACT

A method for delivering information to a user terminal is provided. The method includes obtaining user data. The user data may include a plurality of user activity locations and corresponding user activity time. The method may further include identifying a first position and a second position based on the user activity locations and the user activity time, selecting a travel path based on the first position and the second position, determining a user activity area based on the selected travel path, and sending content to the user terminal based on the user activity area.

30 Claims, 10 Drawing Sheets

Related U.S. Application Data continuation of application No. 14/857,586, filed on Sep. 17, 2015, now Pat. No. 9,952,059.

(51) Int. Cl.
| | | |
|---|---|---|
| *G06F 16/9537* | (2019.01) | |
| *G01C 21/34* | (2006.01) | |
| *G06Q 30/0251* | (2023.01) | |
| *G06Q 30/0282* | (2023.01) | |
| *H04W 4/029* | (2018.01) | |
| *H04W 4/21* | (2018.01) | |

(52) U.S. Cl.
CPC ..... *G06Q 30/0251* (2013.01); *G06Q 30/0282* (2013.01); *H04W 4/023* (2013.01); *H04W 4/025* (2013.01); *H04W 4/029* (2018.02); *H04W 4/21* (2018.02); *Y02D 10/00* (2018.01); *Y02D 30/70* (2020.08)

(58) Field of Classification Search
CPC .. G06Q 30/0282; H04W 4/023; H04W 4/025; H04W 4/029; H04W 4/21; H04W 88/18; Y02D 10/00; Y02D 30/70
See application file for complete search history.

(56) References Cited

U.S. PATENT DOCUMENTS

| | | |
|---|---|---|
| 6,658,095 B1 | 12/2003 | Yoakum et al. |
| 7,595,725 B1 | 9/2009 | Joseph et al. |
| 8,489,599 B2 | 7/2013 | Bellotti |
| 8,892,126 B2 | 11/2014 | Busch |
| 9,445,229 B2 | 9/2016 | Kurokawa |
| 9,803,989 B2 | 10/2017 | Kitchel |
| 2001/0013013 A1 | 8/2001 | Takenaga |
| 2002/0052674 A1 | 5/2002 | Chang et al. |
| 2002/0052925 A1 | 5/2002 | Kim et al. |
| 2002/0111154 A1 | 8/2002 | Eldering et al. |
| 2004/0030493 A1 | 2/2004 | Pechatnikov et al. |
| 2006/0019676 A1 | 1/2006 | Miller et al. |
| 2006/0155597 A1 | 7/2006 | Gleason |
| 2007/0038950 A1 | 2/2007 | Taniguchi et al. |
| 2008/0070588 A1 | 3/2008 | Morin |
| 2008/0248815 A1 | 10/2008 | Busch |
| 2009/0328087 A1 | 12/2009 | Higgings et al. |
| 2010/0151882 A1 | 6/2010 | Gillies et al. |
| 2011/0029670 A1 | 2/2011 | Klein et al. |
| 2011/0060709 A1 | 3/2011 | Ide |
| 2011/0060807 A1 | 3/2011 | Martin et al. |
| 2011/0137834 A1 | 6/2011 | Ide et al. |
| 2011/0177831 A1 | 7/2011 | Huang |
| 2012/0088525 A1 | 4/2012 | Kurokawa et al. |
| 2012/0116861 A1 | 5/2012 | Dobyns |
| 2012/0303455 A1 | 11/2012 | Busch |
| 2013/0060640 A1 | 3/2013 | Gadhia et al. |
| 2013/0097246 A1 | 4/2013 | Zifoni et al. |
| 2014/0172576 A1 | 6/2014 | Spears et al. |
| 2014/0195320 A1 | 7/2014 | Busch |
| 2014/0213300 A1 | 7/2014 | Spears et al. |
| 2014/0274144 A1 | 9/2014 | Des Jardins |
| 2015/0193724 A1 | 7/2015 | Stevens et al. |
| 2015/0193731 A1 | 7/2015 | Stevens et al. |
| 2016/0069697 A1 | 3/2016 | Oel et al. |
| 2016/0069699 A1 | 3/2016 | Chen et al. |

FOREIGN PATENT DOCUMENTS

| | | |
|---|---|---|
| CN | 103886739 A | 6/2014 |
| CN | 103927432 A | 7/2014 |
| JP | 2004070419 A | 3/2004 |
| JP | 2004342031 A | 12/2004 |
| JP | 2005148289 A | 6/2005 |
| JP | 2007264764 A | 10/2007 |
| JP | 2010134586 A | 6/2010 |
| JP | 2013517697 A | 5/2013 |
| JP | WO 2011142225 A1 | 7/2013 |
| JP | 2014086045 A | 5/2014 |
| JP | 2014-529834 A | 11/2014 |
| KR | 10-1399267 | 6/2014 |
| WO | WO2011014558 A2 | 2/2001 |
| WO | WO2007036737 A1 | 4/2007 |

OTHER PUBLICATIONS

A Second Office Action dated Aug. 14, 2018, issued by The State Intellectual Property Office of the People's Republic of China in counterpart Chinese Patent Application No. 201410475482.6.

Communication pursuant to Rule 164(1) EPC enclosing the partial supplementary European Search Report (R. 164 EPC) issued in corresponding Application No. 15841392.2-1557, dated Sep. 22, 2017, 14 pages.

European Patent Office communication pursuant to Rule 62 EPC enclosing the extended European Search Report (Art. 153(7) EPC) issued in corresponding Application No. 15841392.2-1003, dated Feb. 1, 2018, 13 pages.

Japanese Search Report dated Aug. 2, 2019 for issued in Japanese Patent Application No. 2017-514526 (49 pages).

Notice of Preliminary Rejection dated Jun. 19, 2019, issued by the Korean Intellectual Property Office in Counterpart Korean Application No. 10-2017-7010312 (11 pages).

Office Action dated Sep. 9, 2019, issued by the Japanese Patent Office in counterpart Japanese Patent Application No. 2017-514526 (10 pages).

PCT International Search Report and Written Opinion dated Mar. 30, 2016, issued in corresponding International Application No. PCT/IB15/02266 (11 pages).

Supplementary Chinese Search Report dated Nov. 7, 2018, issued by the The State Intellectual Property Office of the People's Republic of China in counterpart Chinese Patent Application No. 201410475482.6 (1 page).

Third Office Action dated Nov. 20, 2018, issued by The State Intellectual Property Office of the People's Republic of China in counterpart Chinese Patent Application No. 201410475482.6 (17 pages).

200

300

400

500

METHOD AND SERVER FOR DELIVERING INFORMATION TO USER TERMINAL

CROSS-REFERENCE TO RELATED APPLICATION

The present application is a continuation of U.S. application Ser. No. 15/960,485, filed Apr. 23, 2018, which is a continuation of U.S. application Ser. No. 14/857,586, filed Sep. 17, 2015, which is based on and claims the benefits of priority to Chinese Patent Application No. 201410475482.6, filed Sep. 17, 2014, all of which are incorporated herein by reference in their entireties.

TECHNICAL FIELD

The present application relates to the technical field of mobile communication and, more particularly, to a method and a server for delivering information to a user terminal.

BACKGROUND

With the rapid development of network technology and smart devices, information push service attracts attention of information service providers and becomes a popular way to distribute content. Information push typically refers to a proactive information delivering mode in which a push server initiatively sends information to a user terminal. For example, an advertisement push server may actively distribute merchant products or services information to consumer terminals.

Information push generally involves delivering information to a user terminal according to its geographic location. For example, a terminal may report its current geographic location to a push server in real time or at short time intervals such that the push server may retrieve information based on the terminal's geographic location and push it the terminal. However, this method requires the terminal to have the positioning capability through a satellite positioning hardware device or a base station. Moreover, since the terminal is required to perform positioning function and report its geographic location frequently, power consumption of the terminal is increased.

SUMMARY

The present disclosure provides a method for delivering information to a user terminal. Consistent with some embodiments, the method includes obtaining user data. The user data may include a plurality of user activity locations and corresponding user activity time. The method may further include identifying a first position and a second position based on the user activity locations and the user activity time, selecting a travel path based on the first position and the second position, determining a user activity area based on the selected travel path, and sending content to the user terminal based on the user activity area Consistent with some embodiments, this disclosure provides a server. The server includes an obtaining unit configured to obtain user data. The user data may include a plurality of user activity locations and corresponding user activity time. The server may further include an identifying unit configured to identify a first position and a second position based on the user activity locations and the user activity time, a selecting unit configured to select a travel path based on the first position and the second position, a determining unit configured to determine a user activity area based on the selected travel path, and a sending unit configured to send content to a user terminal based on the user activity area.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
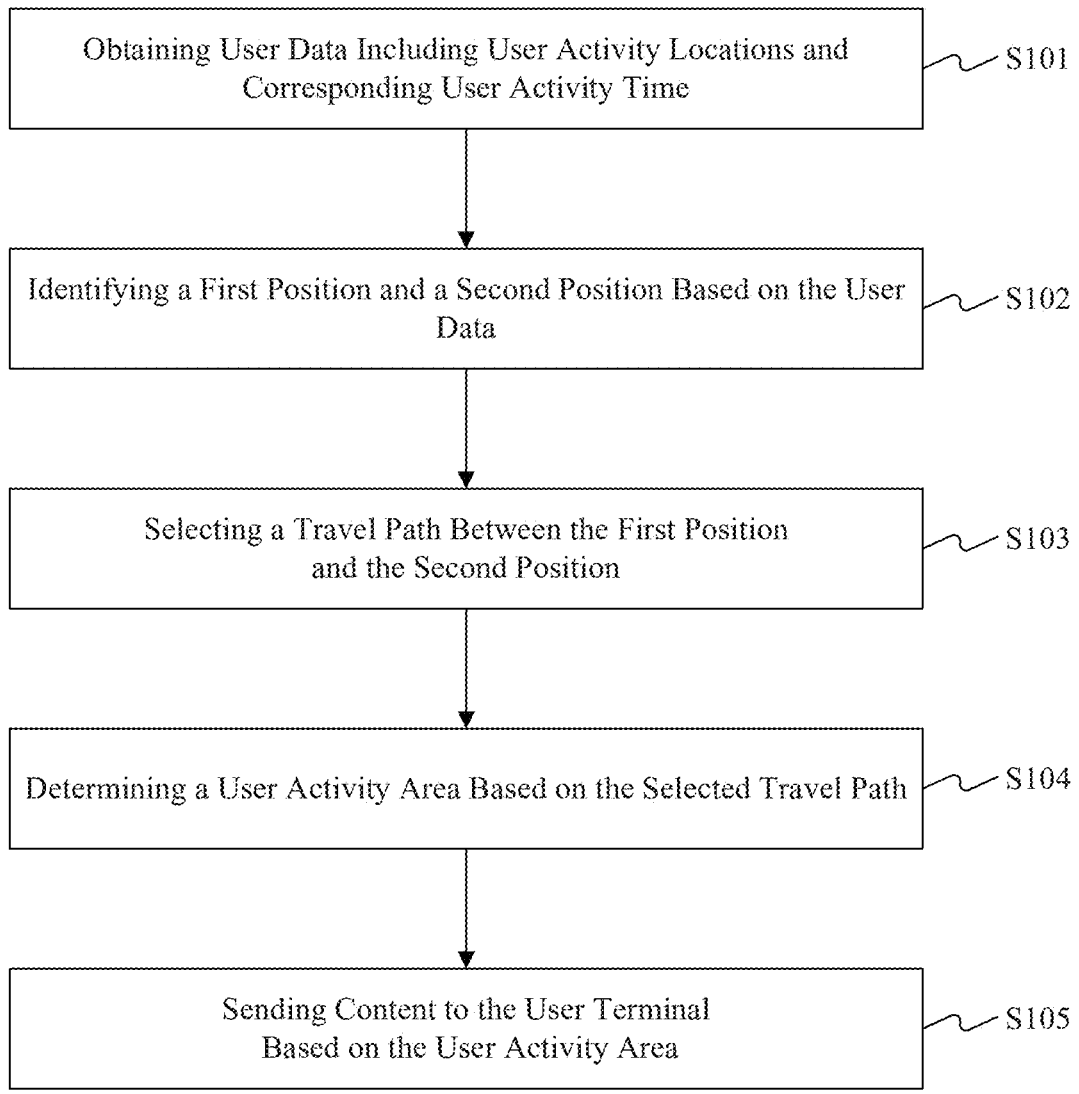
FIG. 1 is a flowchart of an exemplary method for delivering information to a user terminal, consistent with the present disclosure.

FIG. 1 is a flowchart of an exemplary method 100 for delivering information to a user terminal, consistent with the present disclosure. The method 100 may be performed by a server, such as a server providing push services, a server performing data analysis and/or processing, or the like. Referring to FIG. 1, the method 100 includes the following steps.

In step S101, the server obtains user data, where the user data may include user activity locations and corresponding user activity time for various user activities. The user data may be obtained in advance through previously services provided to the user. For example, the server may provide service allowing the user to make purchases, and information of the activity locations and corresponding user activity time may be obtained through the record of user spending histories.

Figure 2:
FIG. 2 is a schematic diagram illustrating user activity location information, consistent with some embodiments of this disclosure.

FIG. 2 is a schematic diagram 200 illustrating user activity locations, consistent with some embodiments of this disclosure. Referring to FIG. 2, the user activity locations include two locations where user activities took place, i.e., a first location and a second location. As shown in FIG. 2, the first and second location each includes multiple geographic positions within a particular area. In other words, the user activity locations included in the user data may represent a location area without pointing to a specific geographic position.

In step S102, the server identifies a first position and a second position based on the user activity locations and the associated user activity time. In some embodiments, the server may determine corresponding time periods of user activity locations based on pre-defined time periods and activity time associated with the user activity locations such that each user activity location corresponds to a predefined time period. In other words, the server may determine for each user activity location, a corresponding time period that belongs to one of the pre-defined time periods. For example, the pre-defined time periods may include two pre-defined time periods, where the first time period may be set from 9:00 am to 5:00 pm, and the second time period may be set from 9:00 pm to 6:00 am of the next day.

Figure 3:
FIG. 3 is a schematic diagram illustrating a first position and a second position, consistent with some embodiments of this disclosure.

FIG. 3 is a schematic diagram 300 illustrating a first position and a second position, consistent with some embodiments of this disclosure. For example, the obtained user data may indicate that user activities from 9:00 am to 5:00 pm are mostly concentrated in the vicinity of a working location, and the user activities from 9:00 pm to 6:00 am of the next day are mostly concentrated in the vicinity of a living location. Correspondingly, as shown in FIG. 3, the server may determine that the first position is the working location, and the second position is the living location according to the daily routine.

As described above in connection with FIG. 2, the first location and second location in the user data may each include a plurality of geographic positions. In some embodiments, a clustering algorithm may be used to obtain specific geographic position information of the first position and second position. The clustering algorithm may group a set of location points in the vicinity of the same location into one cluster, and derive a specific position from the clustered points. In the following description, the first location and second location including a plurality of geographic positions may also be referred to as the first clustering location and the second clustering location respectively.

For example, clustering algorithms such as a K-MEANS algorithm, an agglomerative hierarchical clustering algorithm, or a Density-Based Spatial Clustering of Applications with Noise (DBSCAN) algorithm, may be used to form one or more clusters each including a plurality of location points. Other clustering algorithms may also be used to obtain the location clusters without departing from the scope of the present disclosure.

The DBSCAN algorithm is used as an example to illustrate the clustering process. The DBSCAN algorithm is a density-based spatial clustering algorithm. This algorithm may group points that are closed packed into clusters, discover clusters of arbitrarily shape in spatial database with noise, and define the cluster to be a maximum set of density-connected points. The DBSCAN algorithm aims to filter the low-density area and find the sample points of high density. Different from the traditional hierarchical clusters and convex clusters for clustering, this algorithm may discover a cluster of arbitrarily shape. For example, compared with the K-MEANS algorithm, the DBSCAN algorithm does not require one to specify the number of clusters as an input. The shape of clusters obtained by the DBSCAN algorithm is not biased. Further, the DBSCAN algorithm allows one to input parameters for filtering noise. The DBSCAN algorithm is based on the concept of density-based clusters and requires that the number of the objects (points or the other spatial objects) included in a certain area in the cluster space is not less than a given threshold value. The clustering speed of the DBSCAN algorithm is high, and it can effectively process noise points and find spatial clusters of any shape.

For example, the DBSCAN algorithm may include the following steps. In the first step, an object p unvisited in the database is detected. If p is processed (classified into a cluster or marked as noise), its neighborhood is visited. If the number of objects included in the neighborhood is not less than a pre-defined threshold value, i.e., minPts, a new cluster C is set up, and all points included in the neighborhood are added to a candidate set N. In the second step, the neighborhood of each unprocessed object q in the candidate set N is visited. If at least minPts objects are included in the neighborhood, these objects are added to N. If q is not classified into any cluster, q is added to C. The second step is repeated to continue to visit unprocessed objects in N until N is empty. The above steps are repeated until all objects are classified into a cluster or marked as noise. An example pseudo code of the DBSCAN algorithm is illustrated below in Table 1.

Table 1. Pseudo Code of DBSCN Algorithm

```
Input: data object set D, radius Eps, density threshold
   value MinPts
Output: cluster C
DBSCAN (D, Eps, MinPts)
Begin
init C=0; //number of clusters is initialized to be 0
for each unvisited point p in D
mark p as visited; //mark p as visited
N=getNeighbours (p, Eps);
if sizeOf(N)<MinPts then
mark p as Noise; //if sizeOf(N)<MinPts is satisfied, mark
   p as noise
else
C=next cluster; //set up a new cluster C
ExpandCluster (p, N, C, Eps, MinPts);
end if
end for
End
ExpandCluster(p, N, C, Eps, MinPts)
add p to cluster C; //firstly, add core points to C
for each point p' in N
mark p' as visited;
N'=getNeighbours (p', Eps); //carry out radius check on all
   points in N neighborhood
if sizeOf(N')>=MinPts then
N=N+N'; //if it is more than MinPts, expand number of N
end if
``` if p' is not member of any cluster
add p' to cluster C; // add p' into cluster C
end if
end for
End ExpandCluster Through the use of a clustering algorithm, user activity locations may be grouped into a number of clusters. As shown in FIG. 2, in that example, the user activity locations are divided into two clusters, i.e., the first clustering location and the second clustering location.

In some embodiments, an aggregation point of the plurality of location points included in a cluster may be obtained by calculating a variance, an algorithmic mean, and/or a geometric mean. For example, each of the location points included in a cluster may be presented by a vector, and an aggregation point may be acquired by calculating the variance and/or mean of a plurality of vectors. The corresponding aggregation point of the first and second clustering location may be used as the first and second position respectively.

For example, the first position in the first location cluster may be calculated by using an arithmetic mean. Specifically, the horizontal axis coordinate of the first position may be set as: (point $A_1$ horizontal axis coordinate in the first location cluster+point $A_2$ horizontal axis coordinate in the first location cluster+ . . . +point $A_n$ horizontal axis coordinate in the first location cluster)/n. Similarly, the vertical axis coordinate of the first position may be set as: (point $A_1$ vertical axis coordinate in the first location cluster+point $A_2$ vertical axis coordinate in the first location cluster+ . . . +point $A_n$ vertical axis coordinate in the first location cluster)/n.

In some embodiments, based on the coordinate value of the first position, a corresponding point on a map may be obtained, and the position information of the first position may be set as the position information of the corresponding point on the map. The information of the second position may be obtained in a similar manner and is not repeated herein. For example, the first and second position shown in FIG. 3 may be obtained from the first location and the second location in FIG. 2 using the above described process.

In some implementations, the clustering algorithm parameter for filtering noise may be set to a proper value so as to remove an abnormal point in the map, thereby avoiding the interference of the abnormal point in the calculation of the position information of the first and second position.

Referring back to FIG. 1, in step S103, the server selects a travel path between the first position and the second position. Generally, a direct path may be available between the first position and second position, such as a travel route presented on the map. The user may move between the two position points through this path. For example, assuming that the first position is a working location and the second position is a living location, a user may commute between the living location and the working location regularly by a certain travel mode, such as driving or public transportation. A travel path between the first position and the second position may be determined based on the adopted travel mode, such as a relatively quick route between the first position and the second position.

In some implementations, the travel path between the first position and the second position may be obtained through navigation and/or map software applications. The preference settings of the user in the navigation and/or map application may be used to facilitate the selection of the travel path between the first position and the second position. For example, the user may set a preferred path or a path to avoid in a navigation application. Further, the selected travel path may be modified by the user through a user interface in which the user may drag location points on a displayed travel route to another location and change the travel route correspondingly.

Figure 4:
FIG. 4 is a schematic diagram illustrating a travel path between a first position and a second position, consistent with some embodiments of this disclosure.

FIG. 4 is a schematic diagram 400 illustrating a travel path between a first position and a second position, consistent with some embodiments of this disclosure. As shown in the dotted line of FIG. 4, a travel path between the first position and the second position may be selected using the described methods in step S103.

Figure 5:
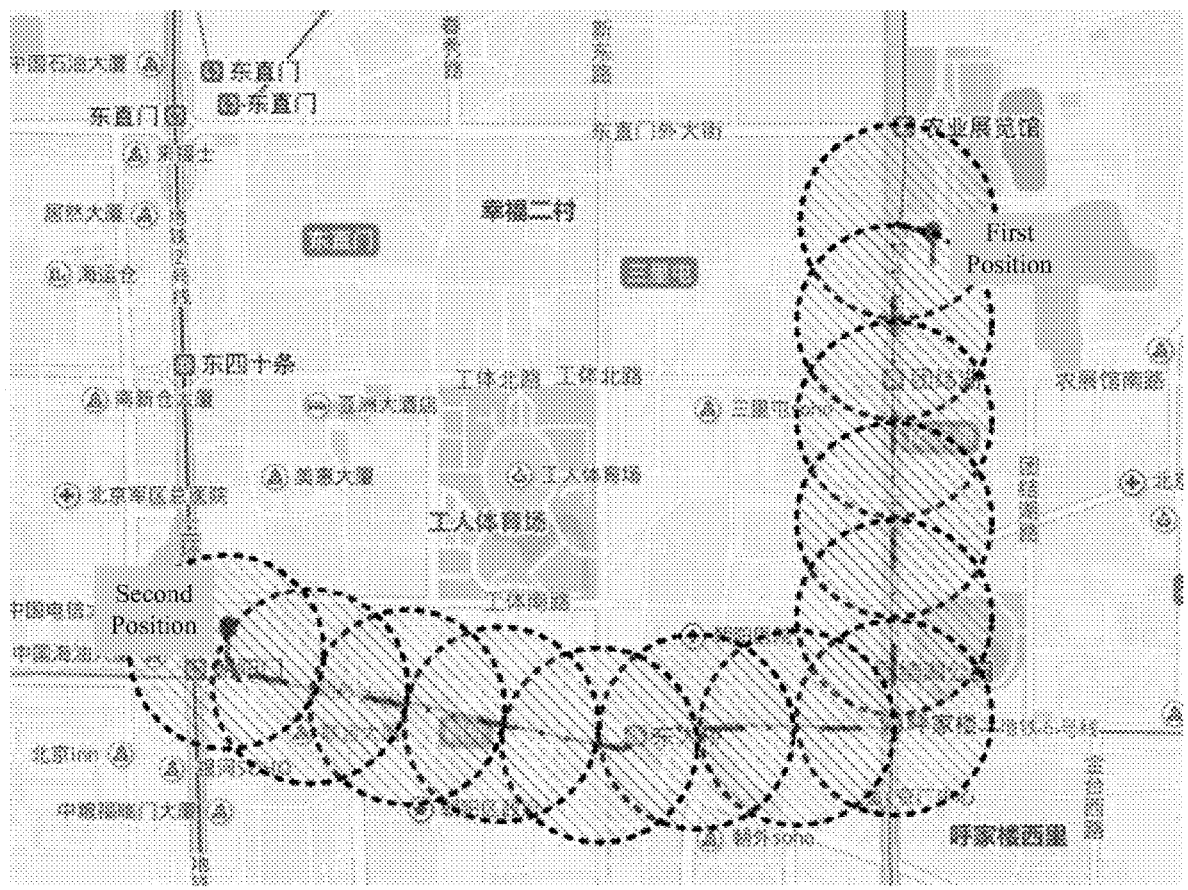
FIG. 5 is a schematic diagram illustrating a user activity area, consistent with some embodiments of this disclosure.

In step S104, the server determines a user activity area based on the selected travel path. FIG. 5 is a schematic diagram 500 illustrating a user activity area, consistent with some embodiments of this disclosure. For example, a number of points may be selected along the travel path at a preset interval, and a number of circles may be generated by taking each of the points as a center with a preset radius value. As shown in FIG. 5, the area included in the circles may be set as the activity area of the user.

Figure 6:
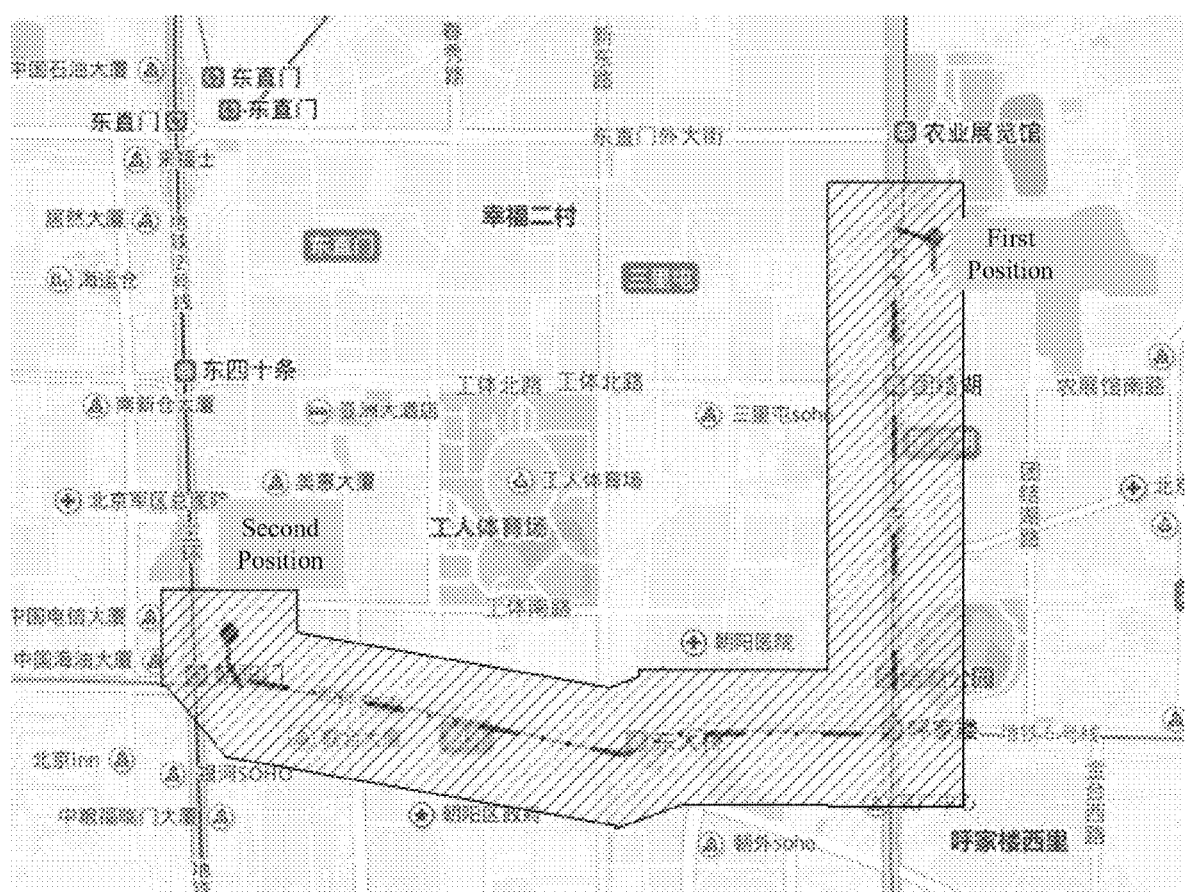
FIG. 6 is another schematic diagram illustrating a user activity area, consistent with some embodiments of this disclosure.

FIG. 6 is another schematic diagram 600 illustrating a user activity area, consistent with some embodiments of this disclosure. For example, a number of points may be selected along the travel path at a preset interval. At each of the points, a line perpendicular to the travel path may be generated, which extends away from the travel path at a preset distance on both sides of the travel path. The end points of the lines on each side of the path may be connected to form a polygon. As shown in FIG. 6, the area enclosed by the polygon may be set as the user activity area.

The user activity areas in FIG. 5 and FIG. 6 are shown for illustration purposes. This disclosure does not intend to limit the means to select a user activity area within a certain distance of the user travel path between the first position and the second position.

In step S105, the server sends content to the user terminal based on the determined user activity area. For example, the content may be provided by registered merchants in the user activity area, and upon requests from the merchants, the server may initiatively push the merchant information to the user terminal. As another example, the content pushed to the user terminal may relate to ongoing or upcoming activities occurring in the user activity area.

In the method 100, the server may determine user activity area based on the user data and push content relevant to the user activity area to the user terminal. In doing so, the user terminal is not required to report its geological location in real time or at short time intervals, thereby saving the power consumption of the terminal.

Figure 7:
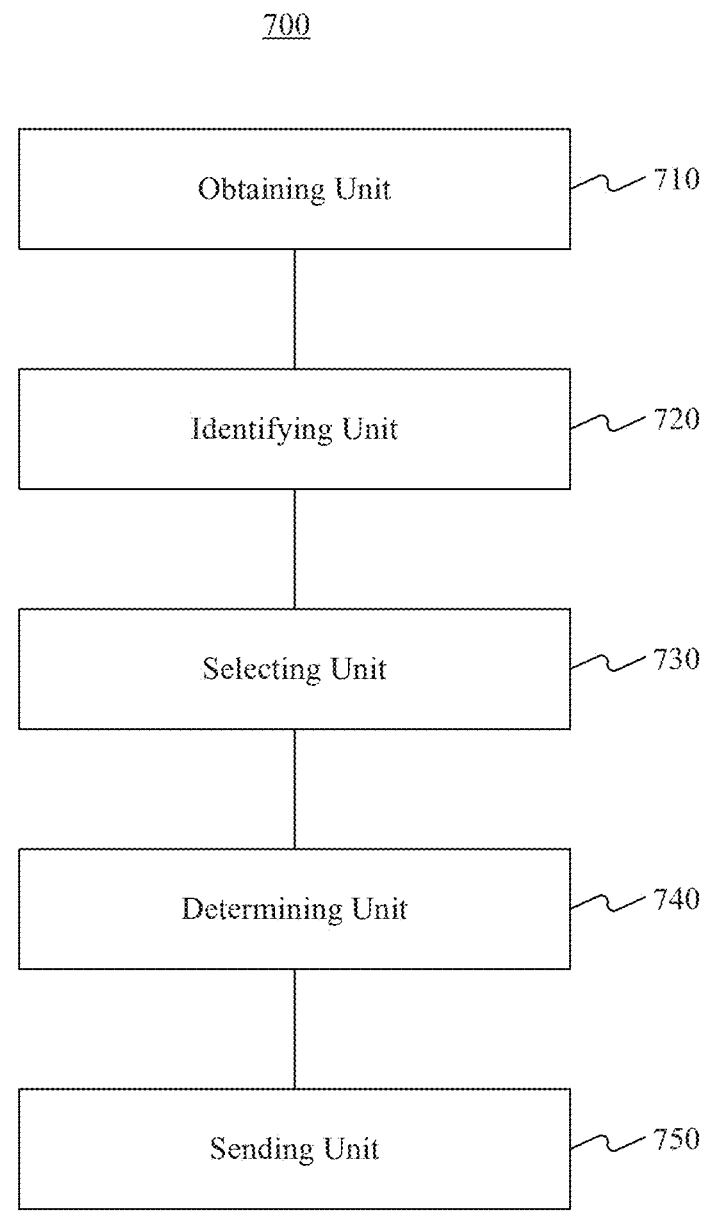
FIG. 7 is a block diagram of an exemplary server, consistent with some embodiments of this disclosure.

FIG. 7 is a block diagram of an exemplary server 700, consistent with some embodiments of this disclosure. Referring to FIG. 7, the server 700 includes an obtaining unit 710, an identifying unit 720, a selecting unit 730, a determining unit 740, and a sending unit 750.

The obtaining unit 710 is configured to obtain user data including user activity locations and corresponding user activity time.

The identifying unit 720 is configured to identify a first position and a second position based on the user activity locations and the associated user activity time.

The selecting unit 730 is configured to select a travel path between the first position and the second position. In some embodiments, the selecting unit 730 may be configured to select the travel path through navigation and/or map software or service. In some embodiments, the selecting unit 730 may also be configured to select the travel path between the first position and the second position based on user's preference settings in a navigation and/or map software.

The determining unit 740 is configured to determine a user activity area based on the selected travel path.

The sending unit 750 is configured to send content to the user terminal based on the user activity area. For example, the content may be provided by a merchant in the user activity area, and the merchant may request the server to push the content to the user terminal. As another example, the content may relate to an ongoing activity or upcoming activity scheduled in the user activity area.

Figure 8:
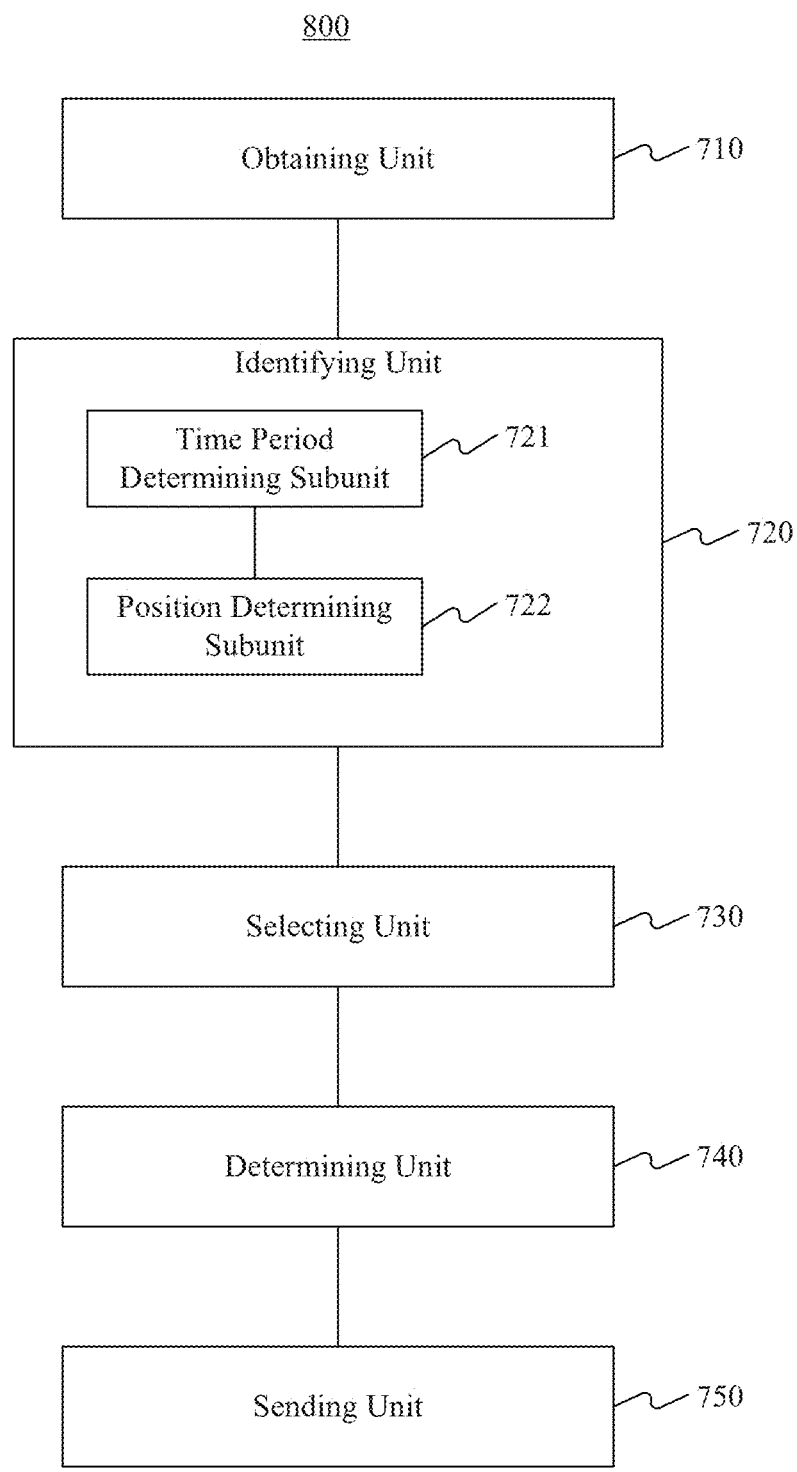
FIG. 8 is a block diagram of another exemplary server, consistent with some embodiments of this disclosure.

FIG. 8 is a block diagram of another exemplary server 800, consistent with some embodiments of this disclosure. Referring to FIG. 8, the server 800 includes an obtaining unit 710, an identifying unit 720, a selecting unit 730, a determining unit 740, and a sending unit 750. Specifically, the identifying unit 720 includes a time period determining subunit 721 and a position determining subunit 722.

The time period determining subunit 721 is configured to determine the time period that each of the user activities occur based on pre-defined time periods and user activity time associated with the user activity locations included in the obtained user data.

The position determining subunit 722 is configured to identify the first position and the second position based on the determined time period corresponding to each of the user activity locations.

Figure 9:
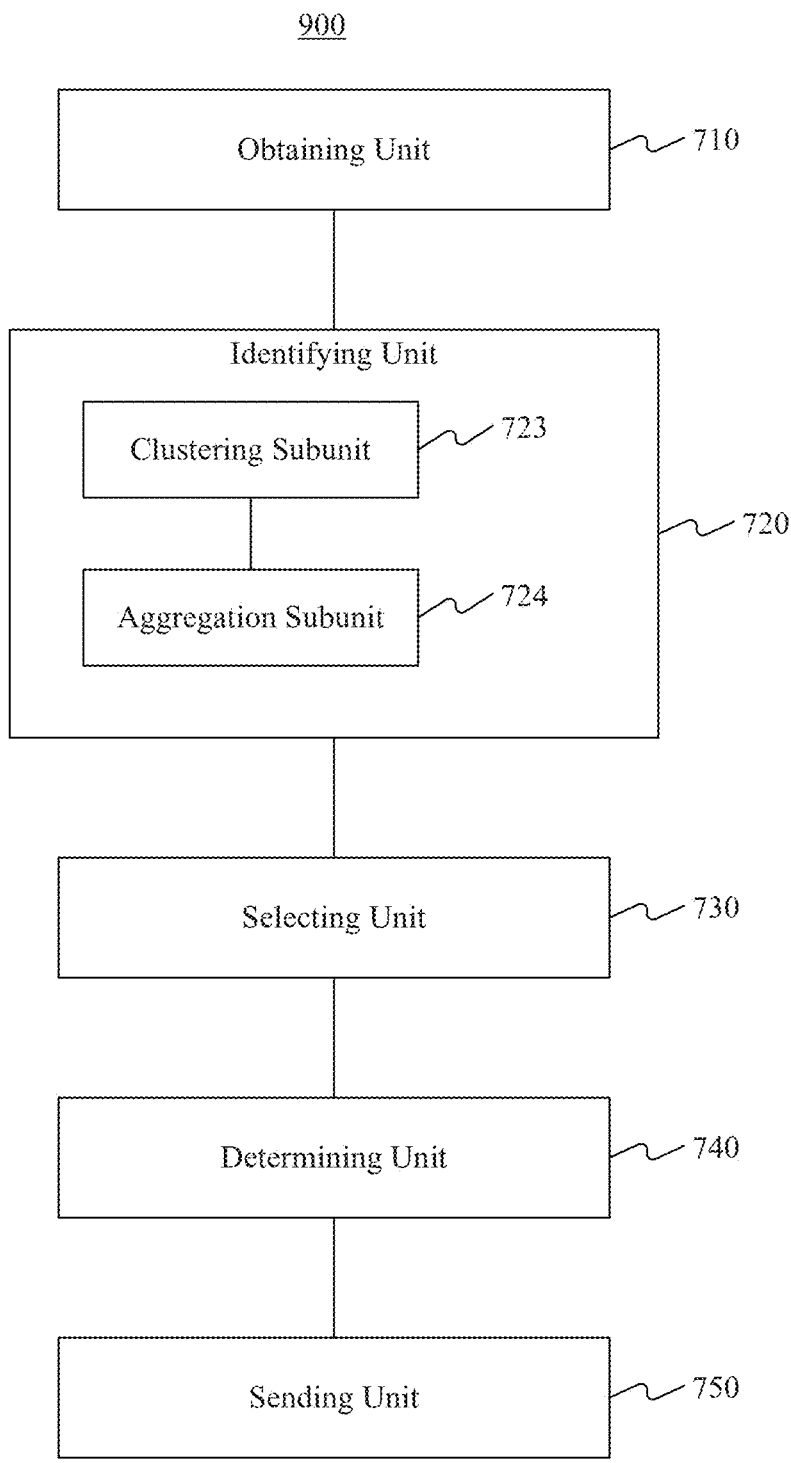
FIG. 9 is a block diagram of another exemplary server, consistent with some embodiments of this disclosure.

FIG. 9 is a block diagram of another exemplary server 900, consistent with some embodiments of this disclosure. Referring to FIG. 9, the server 900 includes an obtaining unit 710, an identifying unit 720, a selecting unit 730, a determining unit 740, and a sending unit 750. Specifically, the identifying unit 720 includes a clustering subunit 723 and an aggregation subunit 724.

The clustering subunit 723 is configured to group the user activity locations into a first clustering location and a second clustering location based on the associated user activity time using a clustering algorithm. In some embodiments, the clustering algorithm may include a K-MEANS algorithm, an agglomerative hierarchical clustering algorithm, or a DBSCAN algorithm.

The aggregation subunit 724 is configured to generate an aggregation point corresponding to each clustering location based on locations included in each clustering location. In some embodiments, the aggregation subunit 724 may be configured to calculate a variance, an arithmetic mean, and/or a geometric mean of the locations included in each clustering location to generate the aggregation point in the corresponding clustering location.

Figure 10:
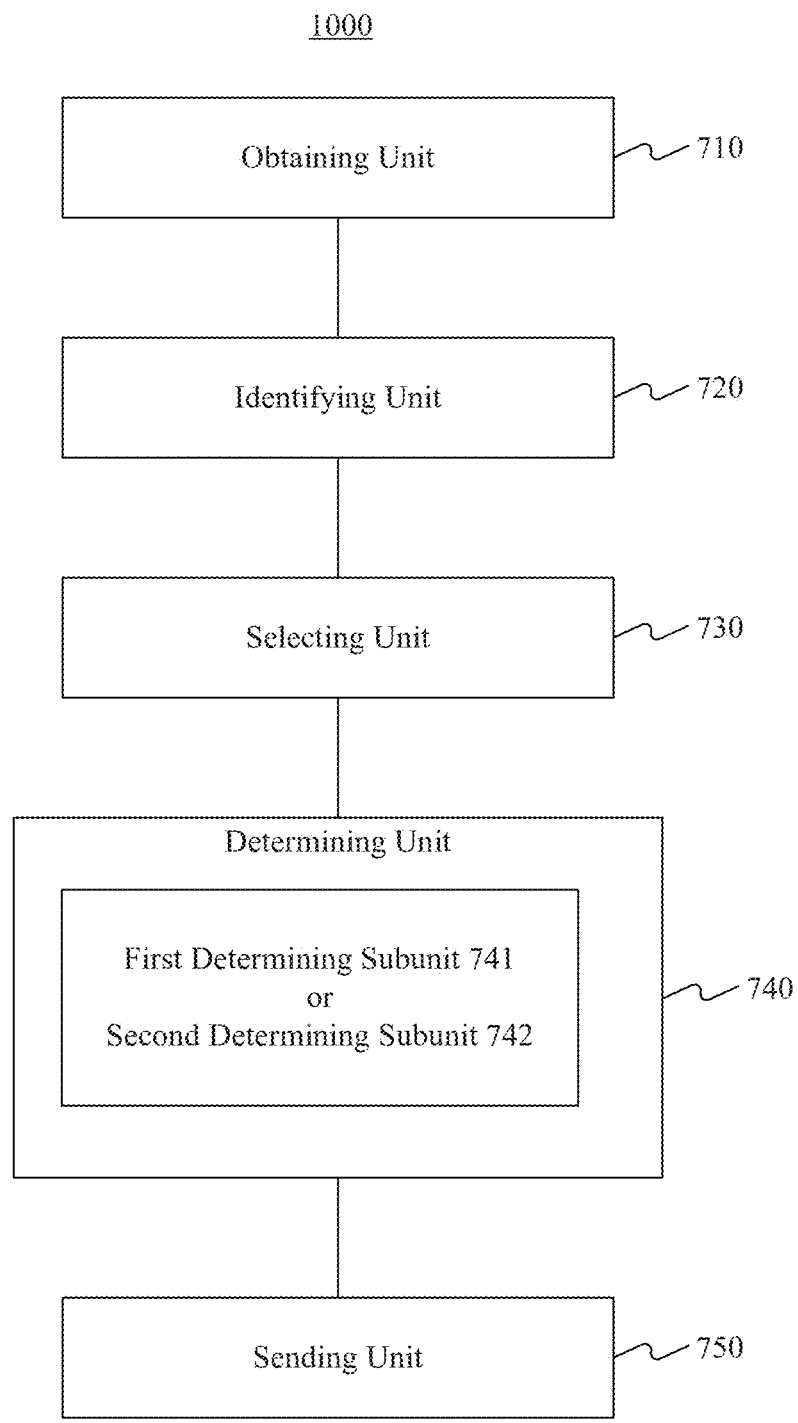
FIG. 10 is a block diagram of another exemplary server, consistent with some embodiments of this disclosure.

FIG. 10 is a block diagram of another exemplary server 1000, consistent with some embodiments of this disclosure. Referring to FIG. 10, the server 1000 includes an obtaining unit 710, an identifying unit 720, a selecting unit 730, a determining unit 740, and a sending unit 750. Specifically, the determining unit 740 may include a first determining unit 741 or a second determining unit 742.

The first determining unit 741 is configured to select points on the selected travel path at a preset interval, generate circles by taking each of the points as a center with a preset radius value, and set the area enclosed by the circles as the user activity area.

The second determining unit 742 is configured to select points on the selected travel path at a preset interval, generate a line perpendicular to the travel path for each of the points which extends away from travel path at a preset distance on both sides, connect end points of the lines on each side of the travel path respectively to obtain a polygon, and set the area included in the polygon as the user activity area.

In exemplary embodiments, a non-transitory computer-readable storage medium including instructions is also provided, and the instructions may be executed by a device (such as a terminal device, a server, a personal computer, or the like), for performing the above-described methods. The device may include one or more processors (CPUs), an input/output interface, a network interface, and/or a memory.

For example, the non-transitory computer-readable storage medium may be read-only memory (ROM), random access memory (RAM), Compact Disc Read-Only Memory (CD-ROM), magnetic tape, floppy disk, and optical data storage device, etc. Examples of RAM include Phase Change Random Access Memory (PRAM), Static Random Access Memory (SRAM), Dynamic Random Access Memory (DRAM), and other types of RAM.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

One of ordinary skill in the art will understand that the above described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for delivering information to a user terminal, comprising:
    obtaining user data, the user data including a plurality of user activity locations;
    identifying a first position and a second position based on the user activity locations, wherein identifying a first position and a second position comprises:

obtaining a first clustering location and a second clustering location based on the plurality of user activity locations, each of the first and second clustering locations including a plurality of geographic positions;

obtaining an aggregation point corresponding to the first clustering location and the second clustering location, respectively, based on the plurality of geographic positions included in each cluster location; and identifying the first position based on the aggregation point for the first clustering location; and identifying the second position based on the aggregation point for the second cluster location;

selecting a travel path based on the first position and the second position;

determining a user activity area based on the selected travel path; and sending content to the user terminal based on the user activity area.

2. The method according to claim 1, wherein identifying a first position and a second position comprises:

for each of the user activity locations, determining an activity time period based on user activity time corresponding to each of the user activity locations, wherein the activity time period is one of a plurality of predefined time periods; and identifying the first position and the second position based on the activity time period corresponding to each of the user activity locations.

3. The method according to claim 1, wherein identifying a first position and a second position comprises:

obtaining the first clustering location and the second clustering location in the user activity locations using a clustering algorithm.

4. The method according to claim 3, wherein the clustering algorithm includes a K-MEANS algorithm, an agglomerative hierarchical clustering algorithm, or a Density-Based Spatial Clustering of Applications with Noise (DBSCAN) algorithm.

5. The method according to claim 3, wherein obtaining an aggregation point corresponding to the first cluster location and the second cluster location comprises:

calculating a variance, an arithmetic mean, or a geometric mean of the geographic positions included in each of the first cluster location and the second cluster location.

6. The method according to claim 1, wherein a navigation software application or a map software application is used in selecting the travel path between the first position and the second position.

7. The method according to claim 1, wherein the travel path between the first position and the second position is selected based on a user's preference settings in a navigation software application or a map software application.

8. The method according to claim 1, wherein determining a user activity area comprises:

selecting a plurality of points on the travel path at a preset interval;

generating a plurality of circles by taking each of the plurality of points as a center and using a preset radius value; and determining an area enclosed by the plurality of circles to be the user activity area.

9. The method according to claim 1, wherein determining a user activity area comprises:

selecting a plurality of points on the travel path at a preset interval;

generating a plurality of lines by originating a line perpendicular to the travel path at each of the plurality of points, the line extending away from the travel path at a preset distance on both sides of the travel path;

connecting end points of the plurality of lines on each side of the travel path to obtain a polygon; and determining an area enclosed by the polygon to be the user activity area.

10. The method according to claim 1, wherein the content sent to the user terminal includes merchant information provided by a merchant in the user activity area or information about an ongoing activity or an upcoming activity in the user activity area.

11. A server, comprising:

a memory storing a set of instruction; and one or more processors configured to execute the set of instructions to cause the server to perform:

obtaining user data, the user data including a plurality of user activity locations;

identifying a first position and a second position based on the user activity locations, wherein identifying a first position and a second position comprises:

obtaining a first clustering location and a second clustering location based on the plurality of user activity locations, each of the first cluster location and the second cluster locating including a plurality of geographic positions;

obtaining an aggregation point corresponding to the first clustering location and the second clustering location, respectively, based on the plurality of geographic positions included in each clustering location;

identifying the first position based on the aggregation point for the first clustering location; and identifying the second position based on the aggregation point for the second clustering location;

selecting a travel path based on the first position and the second position;

determining a user activity area based on the selected travel path;

sending content to a user terminal based on the user activity area.

12. The server according to claim 11, wherein identifying a first position and a second position comprises:

determining, for each of the user activity locations, an activity time period based on user activity time corresponding to each of the user activity locations, wherein the activity time period is one of a plurality of predefined time periods; and identifying the first position and the second position based on the activity time period corresponding to each of the user activity location.

13. The server according to claim 11, wherein identifying a first position and a second position comprises:

obtaining the first clustering location and the second clustering location in the user activity locations using a clustering algorithm.

14. The server according to claim 13, wherein the clustering algorithm includes a K-MEANS algorithm, an agglomerative hierarchical clustering algorithm, or a Density-Based Spatial Clustering of Applications with Noise (DBSCAN) algorithm.

15. The server according to claim 13, wherein aggregation point corresponding to the first cluster location and the second cluster location comprises: calculating a variance, an arithmetic mean, or a geometric mean of the locations included in the first cluster location and the second clustering location to obtain the aggregation point.

16. The server according to claim 11, wherein selecting the travel path between the first position and the second position using a navigation software application or a map software application.

17. The server according to claim 11, wherein selecting the travel path between the first position and the second position based on a user's preference settings in a navigation software application or a map software application.

18. The server according to claim 11, wherein determining a user activity area comprises:
  selecting a plurality of points on the travel path at a preset interval;
  generating a plurality of circles by taking each of the plurality of points as a center and using a preset radius value; and
  determining an area enclosed by the plurality of circles to be the user activity area.

19. The server according to claim 11, wherein determining a user activity area comprises:
  selecting a plurality of points on the travel path at a preset interval;
  generating a plurality of lines by originating a line perpendicular to the travel path at each of the plurality of points, the line extending away from the travel path at a preset distance on both sides of the travel path;
  connecting end points of the plurality of lines on each side of the travel path to obtain a polygon; and
  determining an area enclosed by the polygon to be the user activity area.

20. The server according to claim 11, wherein the content sent to the user terminal includes merchant information provided by a merchant in the user activity area or information about an ongoing activity or an upcoming activity in the user activity area.

21. A non-transitory computer readable medium that stores a set of instructions that is executable by at least one processor of a server to cause the server to perform a method for delivering information to a user terminal, the method comprising:
  obtaining user data, the user data including a plurality of user activity locations;
  identifying a first position and a second position based on the user activity locations, wherein identifying a first position and a second position comprises:
    obtaining a first clustering location and a second clustering location based on the plurality of user activity locations, each of the first and second clustering locations including a plurality of geographic positions;
    obtaining an aggregation point corresponding to the first clustering location and the second clustering location, respectively, based on the plurality of geographic positions included in each cluster location; and
    identifying the first position based on the aggregation point for the first clustering location; and
    identifying the second position based on the aggregation point for the second cluster location;
  selecting a travel path based on the first position and the second position;
  determining a user activity area based on the selected travel path; and
  sending content to the user terminal based on the user activity area.

22. The non-transitory computer readable medium according to claim 21, wherein the set of instructions that is executable by the at least one processor of the server to cause the server to further perform:
  for each of the user activity locations, determining an activity time period based on user activity time corresponding to each of the user activity locations, wherein the activity time period is one of a plurality of predefined time periods; and
  identifying the first position and the second position based on the activity time period corresponding to each of the user activity locations.

23. The non-transitory computer readable medium according to claim 21, wherein the set of instructions that is executable by the at least one processor of the server to cause the server to further perform:
  obtaining the first clustering location and the second clustering location in the user activity locations using a clustering algorithm.

24. The non-transitory computer readable medium according to claim 23, wherein the clustering algorithm includes a K-MEANS algorithm, an agglomerative hierarchical clustering algorithm, or a Density-Based Spatial Clustering of Applications with Noise (DBSCAN) algorithm.

25. The non-transitory computer readable medium according to claim 23, wherein the set of instructions that is executable by the at least one processor of the server to cause the server to further perform:
  calculating a variance, an arithmetic mean, or a geometric mean of the locations included in the first cluster location and the second clustering location.

26. The non-transitory computer readable medium according to claim 21, wherein a navigation software application or a map software application is used in selecting the travel path between the first position and the second position.

27. The non-transitory computer readable medium according to claim 21, wherein the travel path between the first position and the second position is selected based on a user's preference settings in a navigation software application or a map software application.

28. The non-transitory computer readable medium according to claim 21, wherein the set of instructions that is executable by the at least one processor of the server to cause the server to further perform:
  selecting a plurality of points on the travel path at a preset interval;
  generating a plurality of circles by taking each of the plurality of points as a center and using a preset radius value; and
  determining an area enclosed by the plurality of circles to be the user activity area.

29. The non-transitory computer readable medium according to claim 21, wherein the set of instructions that is executable by the at least one processor of the server to cause the server to further perform:
  selecting a plurality of points on the travel path at a preset interval;
  generating a plurality of lines by originating a line perpendicular to the travel path at each of the plurality of points, the line extending away from the travel path at a preset distance on both sides of the travel path;
  connecting end points of the plurality of lines on each side of the travel path to obtain a polygon; and
  determining an area enclosed by the polygon to be the user activity area.

30. The non-transitory computer readable medium according to claim 21, wherein the content sent to the user terminal includes merchant information provided by a merchant in the user activity area or information about an ongoing activity or an upcoming activity in the user activity area.

\* \* \* \* \*

UNITED STATES PATENT AND TRADEMARK OFFICE
CERTIFICATE OF CORRECTION

PATENT NO. : 11,662,220 B2
APPLICATION NO. : 17/328810
DATED : May 30, 2023
INVENTOR(S) : Lei Pang et al.

Page 1 of 1

It is certified that error appears in the above-identified patent and that said Letters Patent is hereby corrected as shown below:

In the Claims

Claim 11, Column 10, Line 16, "a memory storing a set of instruction; and" should read --a memory storing a set of instructions; and--.

Claim 12, Column 10, Lines 52-53, "to each of the user activity location" should read --to each of the user activity locations--.

Claim 15, Column 10, Lines 64-65, "The server according to claim 13, wherein aggregation point" should read --The server according to claim 13, wherein the aggregation point--.

Signed and Sealed this
Eighth Day of July, 2025

Coke Morgan Stewart
*Acting Director of the United States Patent and Trademark Office*